United States Patent
Okita et al.

(10) Patent No.: US 9,862,216 B2
(45) Date of Patent: Jan. 9, 2018

(54) POWER SUPPLY APPARATUS AND CONTROL METHOD

(71) Applicant: CANON KABUSHIKI KAISHA, Tokyo (JP)

(72) Inventors: Hisao Okita, Yokohama (JP); Yasufumi Ogasawara, Tachikawa (JP); Takashi Sakai, Kawasaki (JP); Toru Oshika, Kawasaki (JP); Shinya Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/163,439

(22) Filed: May 24, 2016

(65) Prior Publication Data

US 2016/0347103 A1 Dec. 1, 2016

(30) Foreign Application Priority Data

May 27, 2015 (JP) .................................. 2015-107869

(51) Int. Cl.
*H02J 7/34* (2006.01)
*H02J 7/00* (2006.01)
(Continued)

(52) U.S. Cl.
CPC .............. *B41J 29/38* (2013.01); *H02J 7/0075* (2013.01); *H02M 1/088* (2013.01); *H02J 7/0021* (2013.01); *H02J 7/045* (2013.01); *H02J 7/345* (2013.01)

(58) Field of Classification Search
CPC ............ B41J 2/01; B41J 2/0452; B41J 29/38; H02M 1/081; H02M 1/088; H02J 7/0075; H02J 7/345; H02J 7/045; H02J 7/0021
See application file for complete search history.

(56) References Cited

U.S. PATENT DOCUMENTS

2003/0227280 A1* 12/2003 Vinciarelli .............. H02J 1/102
                                                                   323/265
2004/0008016 A1* 1/2004 Sutardja ................ H02M 1/088
                                                                  323/283

(Continued)

FOREIGN PATENT DOCUMENTS

| JP | H08-180907 A | 7/1996 |
|---|---|---|
| JP | 2009-286096 A | 12/2009 |
| WO | 2008/042490 A2 | 4/2008 |

*Primary Examiner* — Patrick King
(74) *Attorney, Agent, or Firm* — Canon USA, Inc. I.P. Division

(57) ABSTRACT

A power supply apparatus includes a power source unit supplying power to an electric load through a power supply line, a capacitor connected to the power supply line, a charge circuit charging the capacitor while restricting a current value of the power supplied from the power source unit, a detection unit detecting a voltage value of the capacitor, a controller which switches, after the charge of the capacitor is completed, a current value of the charge circuit to a first current value smaller than a current value supplied before the charge of the capacitor is completed, a first determination unit determining whether a first condition is satisfied based on the voltage value detected by the detection unit after the charge of the capacitor is completed, and a second determination unit determining whether an error process is to be performed based on a determination result of the first determination unit.

23 Claims, 13 Drawing Sheets

(51) Int. Cl.
*B41J 2/355* (2006.01)
*B41J 29/38* (2006.01)
*H02M 1/088* (2006.01)
H02J 7/04 (2006.01)

(56) References Cited

U.S. PATENT DOCUMENTS

| | | |
|---|---|---|
| 2009/0295845 A1 | 12/2009 | Nakata |
| 2011/0148368 A1* | 6/2011 | Burns .................. H03K 17/102 323/225 |
| 2014/0002007 A1 | 1/2014 | Patino |
| 2015/0076905 A1* | 3/2015 | Ingemi .................... H02J 9/062 307/31 |

* cited by examiner

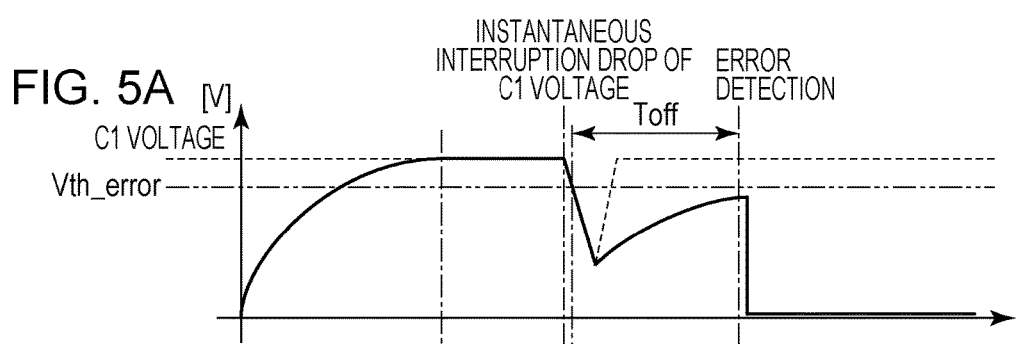
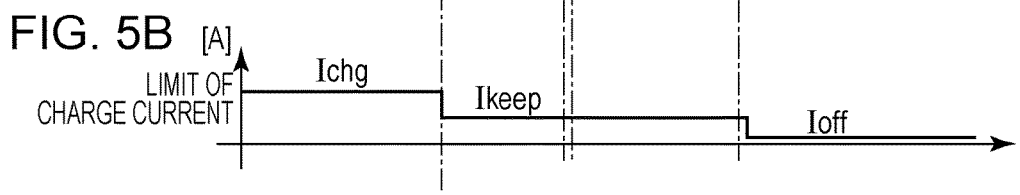

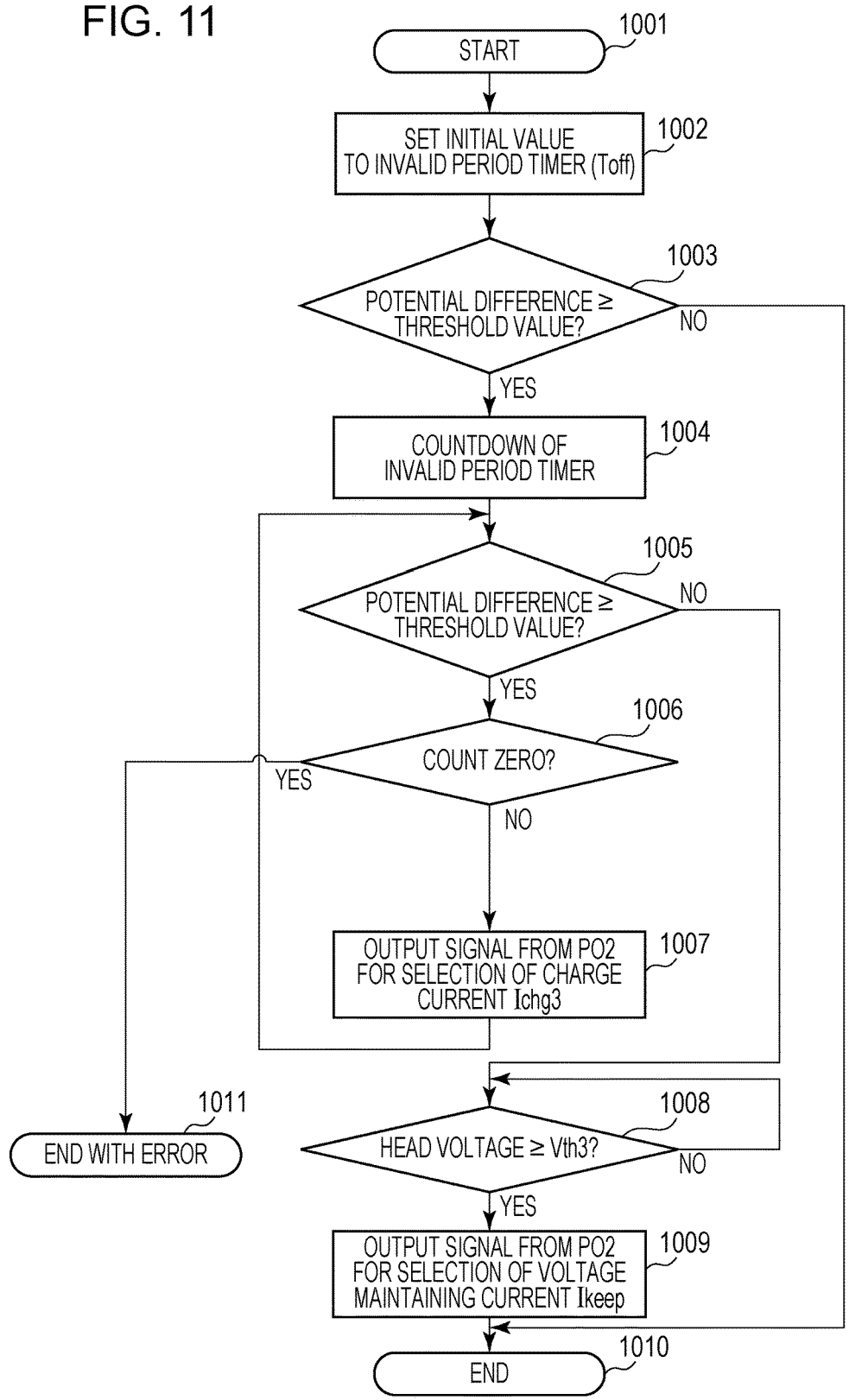

POWER SUPPLY APPARATUS AND CONTROL METHOD

BACKGROUND OF THE INVENTION

Field of the Invention

The present invention relates to power supply apparatuses and control methods, and particularly relates to a power supply apparatus including a unit which controls power supply to a load and a control method.

Description of the Related Art

In recent years, the number of nozzles which eject ink is increased so that a printing speed and printing resolution are improved in inkjet recording apparatus (hereinafter also referred to as a "recording apparatus"). For example, in a case of a recording apparatus employing a thermal method, a heater is disposed in a position near an ink ejection port and electric power is supplied to the heater so that ink is instantaneously transformed into bubbles and the ink is ejected by kinetic energy of the bubbles.

In such a recording apparatus, an amount of electric power consumed at a time of image forming is changed depending on density of an image. In a case where an image of high density is to be formed, a large number of nozzle driving heaters are instantaneously turned on so as to eject a large amount of ink on a sheet surface, and large current is supplied to a head including the nozzles in a short time.

In a case where large current is to be instantaneously supplied, impedance of a power source is required to be reduced, and therefore, a printer configured such that an electrolytic capacitor having a small equivalent series resistance value and a large capacitance is connected to a power source line near a recording head has been widely used (refer to Japanese Patent Laid-Open No. 2009-286096).

According to Japanese Patent Laid-Open No. 2009-286096, voltage monitoring is performed while a charge state is maintained, and when a potential drops to a certain voltage, it is determined that failure occurs, and electric power is not supplied to a head after that. Furthermore, according to Japanese Patent Laid-Open No. 2009-286096, drop of a power source voltage owing to instantaneous interruption of a power source is detected while the drop of the power source voltage is not mistakenly detected as a short-circuit state of the recording head, before timer monitoring is performed for a certain period of time. An error is not detected if the power source voltage of the recording head recovers within a timer time.

Here, in a case where an electrolytic capacitor having a large capacitance is connected to a head power source circuit, it is likely that a charge time of the electrolytic capacitor becomes long and a period of time required for recovering a voltage at a time of instantaneous interruption becomes long. In this case, the power source voltage of the recording head does not recover within the timer time, and accordingly, an error may be detected. On the other hand, if large current is supplied so that the charge time of the electrolytic capacitor is reduced, the voltage does not drop in a short time even if leakage current is abnormally generated in the head, and accordingly, detection of failure delays.

SUMMARY OF THE INVENTION

A power supply apparatus includes a power source unit configured to supply electric power to an electric load through a power supply line, a capacitor arranged to be connected to the power supply line which connects the power source unit and the electric load to each other, a charge circuit configured to charge the capacitor while restricting a current value of the electric power supplied from the power source unit, a detection unit configured to detect a voltage value of the capacitor, a controller configured to switch, after the charge of the capacitor is completed, a current value of the charge circuit to a first current value which is smaller than a current value supplied before the charge of the capacitor is completed, a first determination unit configured to determine whether a first condition is satisfied in accordance with the voltage value detected by the detection unit after the charge of the capacitor is completed, and a second determination unit configured to determine whether an error process is to be performed in accordance with a result of the determination performed by the first determination unit. If the first determination unit determines that the first condition is satisfied after the charge of the capacitor is completed, the controller switches the current value supplied from the charge circuit to a current value which is larger than the first current value. The second determination unit determines whether an error process is to be performed in accordance with a result of the determination performed by the first determination unit when a predetermined period of time has elapsed after the first determination unit determines that the first condition is satisfied.

Further features of the present invention will become apparent from the following description of exemplary embodiments with reference to the attached drawings.

BRIEF DESCRIPTION OF THE DRAWINGS

FIGS. 5A and 5B are diagrams illustrating error detection at a time when instantaneous interruption occurs.

FIG. 11 is a flowchart illustrating an operation of supplying electric power to a recording head according to the second embodiment.

DESCRIPTION OF THE EMBODIMENTS

Hereinafter, embodiments of the present invention will be described with reference to the accompanying drawings.

First Embodiment

Figure 1:
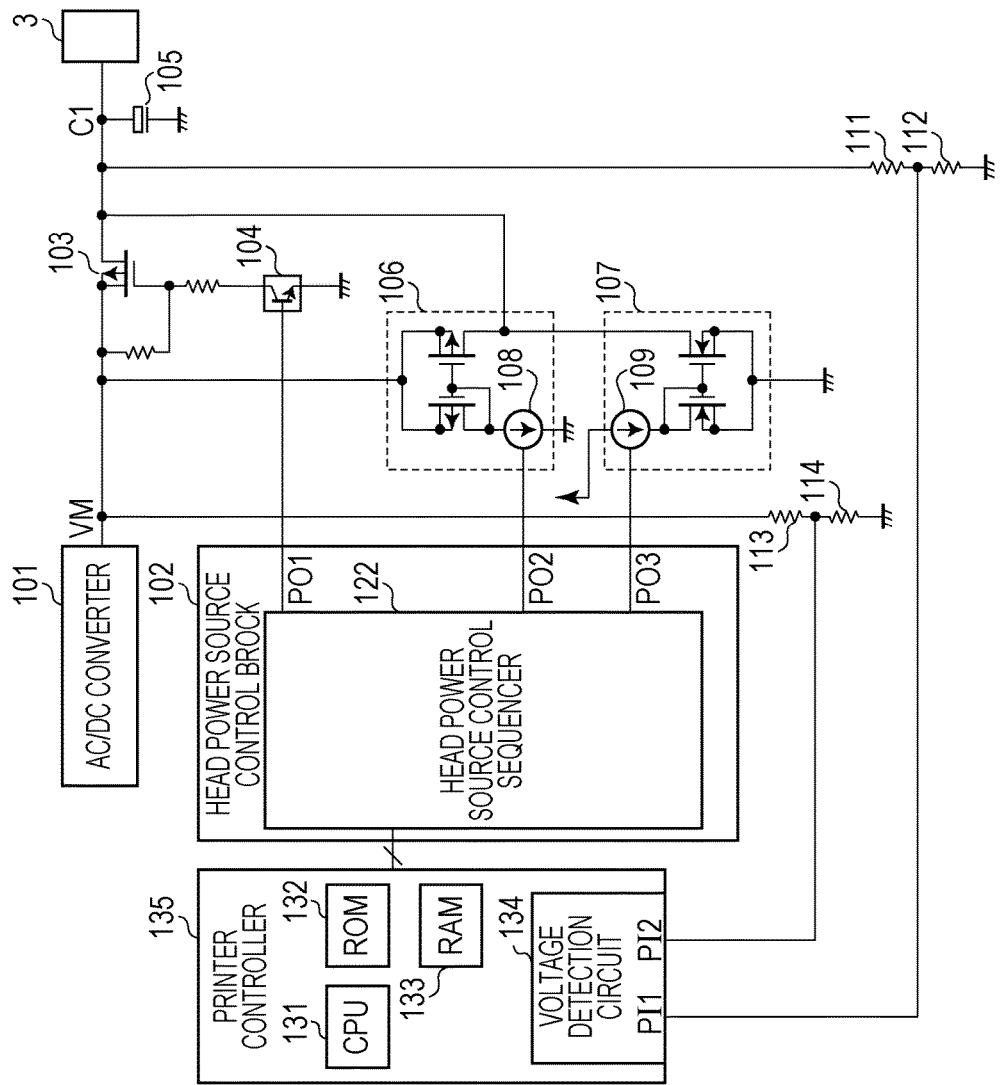
FIG. 1 is a block diagram illustrating a configuration of a control circuit of a printer according to a first embodiment.

FIG. 1 is a block diagram illustrating a main configuration of a control circuit of a printer which is an example of a power supply apparatus according to a first embodiment. Although a printer having a printing function is described as an example in FIG. 1, the printer is not limited to this, and a multifunction printer having a printing function and a reading function, for example, may be used. Furthermore, the power supply apparatus is not limited to the printer, and the power supply apparatus may not include a printing function as long as the power supply apparatus supplies electric power to a load.

The printer illustrated in FIG. 1 includes a power source circuit 101, a head power source control block 102, a printer controller 135, a charge circuit 106, a discharge circuit 107, a recording head 3, and an electrolytic capacitor 105. The printer controller 135 includes a CPU 131 for controlling the printer, a RAM 133, a ROM 132, and a voltage detection circuit 134. The printer further includes a field effect transistor (FET) 103 and a transistor 104. In this embodiment, "electric power supplied from a power source" means electric power supplied from the power source circuit 101 to the recording head 3.

The power source circuit 101 is a so-called power source unit, and is an AC/DC converter which generates a DC voltage for driving the recording head 3 from an AC power source. In FIG. 1, the DC voltage output from the power source circuit 101 is denoted by "VM".

The printer control CPU 131 is a central processing unit which controls the entire recording apparatus, and controls operation of the entire printer by executing programs or activating hardware.

The ROM 132 stores the programs for controlling the entire recording apparatus and setting parameters. The RAM 133 is used as a work area for converting a print job which is externally input into print data and for developing programs, and temporarily stores parameters and image data.

The head power source control block 102 controls electric power to be supplied to the head 3.

The voltage detection circuit 134 detects a voltage of a power supply line used to supply electric power to the recording head 3 (a head power source voltage). Note that the head power source voltage is also referred to as an "electrolytic capacitor voltage" hereinafter. This is because a voltage of the electrolytic capacitor 105 is equal to the head power source voltage. The voltage detection circuit 134 may be an AD converter or a circuit including a plurality of comparators which are aligned and having a plurality of threshold values. The head power source voltage is divided into resistances 111 and 112 and supplied to the voltage detection circuit 134 through an input terminal PI1. The voltage (the VM voltage) of the power source circuit 101 is divided into resistances 113 and 114 and supplied to the voltage detection circuit 134 through an input terminal PI2.

A head power source control sequencer 122 controls an on state and an off state of the transistor 104 by outputting a signal from an output terminal PO1. Furthermore, the head power source control sequencer 122 controls current values of the charge circuit 106 and the discharge circuit 107. Moreover, the head power source control sequencer 122 controls a current value output from the charge circuit 106 by outputting a signal from an output terminal PO2 and controls a current value discharged from the discharge circuit 107 by outputting a signal from an output terminal PO3.

The printer control CPU 131 and the head power source control block 102 may be implemented in an LSI as the same integrated circuit or different LSIs.

The recording head 3 (a print head) performs a printing operation in accordance with an electric power load. Note that, in this embodiment, the recording head 3 includes different ink tanks of different colors, and performs recording by ejecting ink droplets on a recording medium (such as a sheet). Note that the recording head 3 may eject ink while moving along a shaft supporting a head carriage in a direction orthogonal to a conveyance direction or may have a line head having nozzle arrays of different colors in the conveyance direction. Furthermore, the printer of this embodiment performs printing by a thermal method, and includes a plurality of heaters in the vicinity of an ink ejection port. Electric power is supplied to the heaters so that ink is instantaneously transformed into bubbles and the ink is ejected by kinetic energy of the bubbles.

The electrolytic capacitor 105 supplies electric power to the recording head 3 and has a function of absorbing a load change which is changed depending on an ink discharge state. The electrolytic capacitor 105 and the recording head 3 are connected to a power supply line in parallel. In this embodiment, the electrolytic capacitor 105 has a small equivalent serial resistance value and large capacity. Since the electrolytic capacitor 105 having large capacity is used, a large amount of charge accumulated in the electrolytic capacitor 105 is supplied as instantaneous electric power when an image of high density is to be formed. By this, drop of a voltage for driving the heaters is suppressed even in a state in which large current is instantaneously supplied, and accordingly, stable ink ejection may be realized.

The FET 103 is turned on when the recording head 3 requires large electric power for a printing operation. In this embodiment, a gate is opened or closed when the transistor 104 is turned on or off as PMOS. The transistor 104 is connected to the output terminal PO1 of the head power source control block 102 and turned on or off when a signal supplied from the head power source control sequencer 122 is in a high level or a low level. Note that, in this embodiment, the FET 103 is in an off state when the charge circuit 106 charges the electrolytic capacitor 105.

The charge circuit 106 is used to charge the electrolytic capacitor 105. The discharge circuit 107 is used to perform discharge from the electrolytic capacitor 105.

The charge circuit 106 charges the electrolytic capacitor 105 while restricting a current value of electric power supplied from the power source circuit 101. The charge circuit 106 which is a constant current circuit having a current mirror structure includes a FET and a constant current source 108 which generates a reference current. The constant current source 108 is controlled by the output terminal PO2 of the head power source control block 102 and capable of performing switching of a current value in a plurality of stages. In this embodiment, a charge time may be reduced by switching of current supplied from the charge circuit 106. Specifically, current supplied from the charge circuit 106 has a high current value when the electrolytic capacitor 105 is charged, whereas current supplied from the charge circuit 106 has a low current value after the charge of the electrolytic capacitor 105 is completed. Note that the switching of a current value performed by the constant current source 108 will be described in detail later.

As with the charge circuit 106, the discharge circuit 107 which is also a constant current circuit having a current mirror structure also includes a FET and a constant current source 109 which generates a reference current. Furthermore, the constant current source 109 is connected to the output terminal PO3 of the head power source control block 102, and as with the constant current source 108, is capable of performing switching of a current value in a plurality of stages.

Figure 2A:
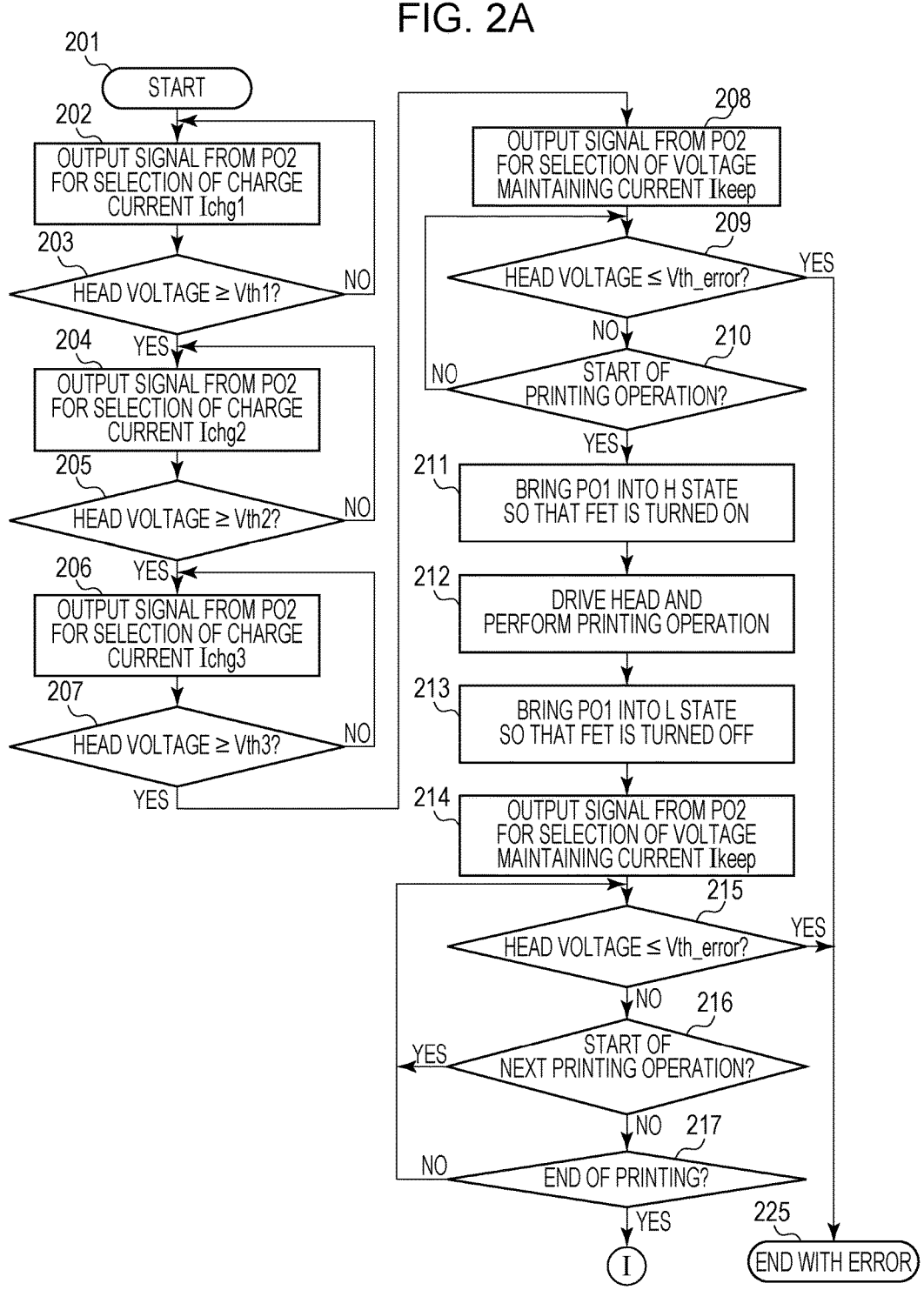
FIGS. 2A and 2B are a flowchart illustrating an operation of supplying electric power to a recording head according to the first embodiment.
Figure 2B:
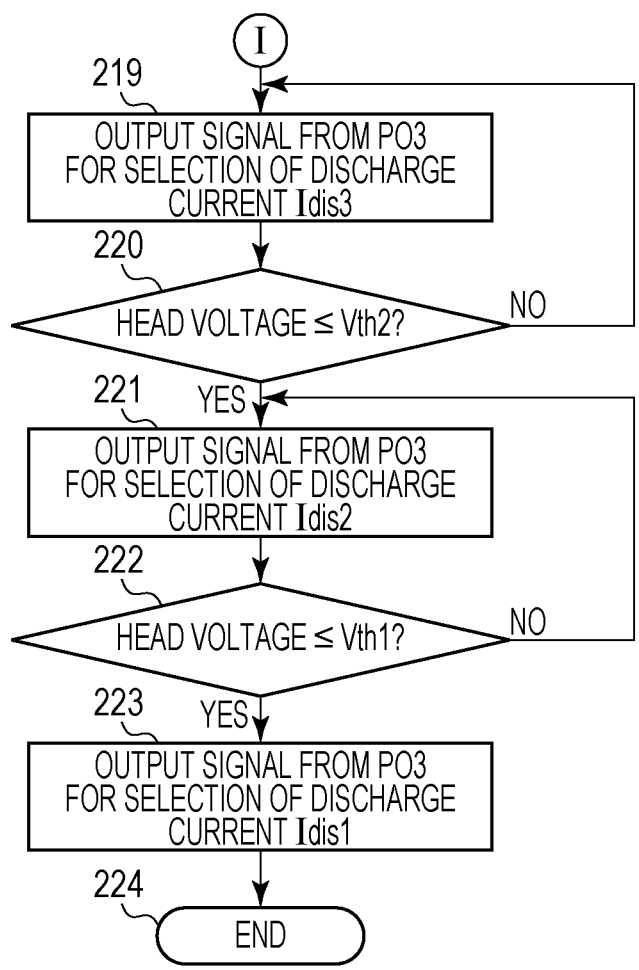

A sequence of a voltage monitoring operation of a head power source according to this embodiment will be described with reference to FIGS. 2A and 2B and FIGS. 3A to 3C. FIGS. 2A and 2B are a flowchart illustrating an operation of supplying electric power to the recording head 3.

The flowchart illustrated in FIGS. 2A and 2B is realized when the CPU 131 reads a program stored in the ROM 132 into the RAM 133 and executes the program. Specifically, a flow from reception of a print instruction by the printer to a printing operation started when electric power is supplied to the recording head 3 which has not been turned on is illustrated.

When the printer receives a print instruction, control of a power source voltage is started (S201) and the electrolytic capacitor 105 is charged (S202 to S207). Here, "Ichg1", "Ichg2", and "Ichg3" illustrated in FIGS. 2A and 2B and FIGS. 3A to 3C denote charge currents supplied from the charge circuit 106 and are used depending on a voltage state of the electrolytic capacitor 105 in a switching manner. Specifically, when a voltage of the electrolytic capacitor 105 monitored by the voltage detection circuit 134 exceeds predetermined voltage threshold values (Vth1 and Vth2), a charge current value is increased to predetermined values (Ichg2 and Ichg3). In this way, in this embodiment, charge may be completed as quickly as possible while thermal restriction of the FET of the charge circuit 106 is satisfied by switching the charge current value. In this embodiment, heat obtained by a product of a potential difference between a source and a drain of the FET of the charge circuit 106 and a current value output from the charge circuit 106 is set to be equal to or lower than allowable power dissipation of the FET of the charge circuit 106. In a case where the potential difference between the source and the drain is VM–Vth1 and the current value is Ichg1, for example, an amount of heat generated in the charge circuit 106 is represented by "(VM–Vth1)×Ichg1". Similarly, in a case where the potential difference between the source and the drain is VM–Vth2 and the current value is Ichg2, for example, an amount of heat generated in the charge circuit 106 is represented by "(VM–Vth2)×Ichg2". Furthermore, in a case where the potential difference between the source and the drain is VM–Vth3 and the current value is Ichg3, for example, an amount of heat generated in the charge circuit 106 is represented by "(VM–Vth3)×Ichg3". All the amounts of heat (VM–Vth1)×Ichg1, (VM–Vth2)×Ichg2, and (VM–Vth3)×Ichg3 are set to be equal to or smaller than certain allowable power dissipation. Accordingly, the current value Ichg1 is comparatively small in a case where the voltage of the electrolytic capacitor 105 is equal to or smaller than the threshold value Vth1 which has a large potential difference from the voltage VM whereas the current value Ichg3 is comparatively large in the case where the voltage of the electrolytic capacitor 105 is equal to or larger than the threshold value Vth3 which has a small potential difference from the voltage VM. Although the switching of a current value among the three stages is illustrated in this embodiment, the present invention is not limited to this, and the number of stages of the switching of a current value may be larger or smaller than 3. First, the head power source control sequencer 122 outputs a signal from the output terminal PO2 so as to select the charge current value Ichg1 of the charge circuit 106 (S202), and determines whether a voltage of the electrolytic capacitor 105 detected by the voltage detection circuit 134 is equal to or larger than the threshold value Vth1 (S203). When determining that the voltage of the electrolytic capacitor 105 is equal to or larger than the threshold value Vth1 (Yes in step S203), the head power source control sequencer 122 outputs a signal from the output terminal PO2 so as to select the charge current value Ichg2 of the charge circuit 106 (S204). Specifically, the charge current value of the charge circuit 106 is switched from Ichg1 to Ichg2. Then, the head power source control sequencer 122 determines whether the voltage of the electrolytic capacitor 105 detected by the voltage detection circuit 134 is equal to or larger than the threshold value Vth2 (S205). When determining that the voltage of the electrolytic capacitor 105 is equal to or larger than the threshold value Vth2 (Yes in step S205), the head power source control sequencer 122 outputs a signal from the output terminal PO2 so as to select the charge current value Ichg3 of the charge circuit 106 (S206). Specifically, the charge current value of the charge circuit 106 is switched from Ichg2 to Ichg3.

Figure 3A:
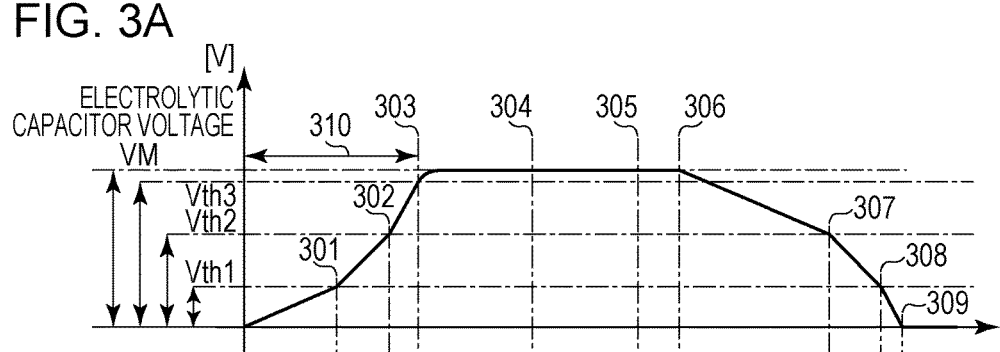
FIGS. 3A to 3C are timing charts illustrating charge to and discharge from an electrolytic capacitor.
Figure 3B:
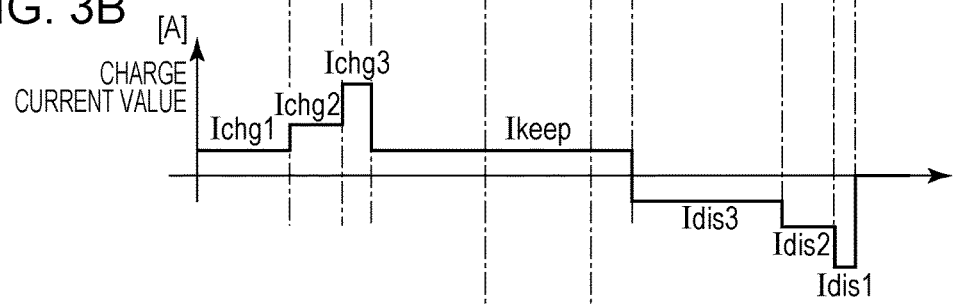
Figure 3C:
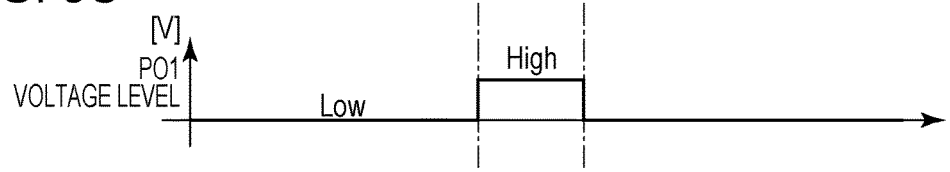

FIG. 3A is a timing chart illustrating a voltage of the electrolytic capacitor 105 monitored by the voltage detection circuit 134. FIG. 3B is a timing chart illustrating charge current to the electrolytic capacitor 105 and discharge current from the electrolytic capacitor 105, and FIG. 3C is a timing chart illustrating a voltage level of the output terminal PO1.

A curve of voltage rise becomes steep in a period 310 in which the electrolytic capacitor 105 is charged. This is because, as illustrated in FIG. 3B, the charge current value is switched from Ichg1 to Ichg2 at a timing 301 when the voltage of the electrolytic capacitor 105 becomes equal to or larger than the threshold value Vth1.

After the charge current value Ichg3 is selected, it is determined whether the voltage of the electrolytic capacitor 105 detected by the voltage detection circuit 134 is equal to or larger than the threshold value Vth3 (S207). When it is determined that the voltage of the electrolytic capacitor 105 is equal to or larger than the threshold value Vth3 (Yes in step S207), the head power source control sequencer 122 outputs a signal from the output terminal PO2 so as to select a current value Ikeep for maintaining a voltage as a charge current value of the charge circuit 106 (S208). Specifically, the charge current value of the charge circuit 106 is switched from Ichg3 to Ikeep. In the state of the current value Ikeep, increase of leakage may be detected while the voltage of the electrolytic capacitor 105 is maintained. Accordingly, the current value Ikeep is smaller than a value obtained when the charge current value is increased (Ichg3, for example). In this embodiment, the current value Ikeep is smaller than the current value Ichg1, that is, the current value supplied from the charge circuit 106 at a time of charging.

Then, it is determined whether the voltage of the electrolytic capacitor 105 detected by the voltage detection circuit 134 is equal to or smaller than a threshold value Vth_error (S209). When it is determined that the voltage of the electrolytic capacitor 105 is not equal to or smaller than the threshold value Vth_error (No in step S209), the process proceeds to step S210, and otherwise (Yes in step S209), the process is terminated as an error. Here, the threshold value Vth_error is used to specify failure of the power supply circuit and failure of the head 3. When the voltage of the electrolytic capacitor 105 is equal to or smaller than the threshold value Vth_error, it is determined that failure occurs in at least one of the power supply circuit and the head 3. Note that monitoring of the voltage of the electrolytic capacitor 105 is performed after the electrolytic capacitor 105 is charged and before discharge is performed. The current value Ikeep and the sequence 209 will be described later. Examples of a case where failure occurs in the power supply circuit or the head 3 include a case where insulation failure occurs in an electric contact of the recording head 3, a case where leakage current of the recording head 3 is increased, and a case where the power supply circuit is short-circuited. In this case, a potential becomes equal to or smaller than the certain voltage (Vth_error). In this case, when printing is executed, printing failure or failure of the printer occurs.

When the charge circuit 106 completes the charge of the electrolytic capacitor 105 and print data is prepared, it is determined that the printing operation is to be started (S210). First, in step S211, a voltage level of the output terminal PO1 of the head power source control sequencer 122 is brought into a high level (refer to a timing 304 of FIG. 3C). In other words, the head power source control sequencer 122 outputs a signal from the output terminal PO1 so as to turn on the transistor 104. By this, the FET 103 is turned on. Note that, if the FET 103 is not to be turned on, current supplied from the charge circuit 106 to the power supply line is in an Ikeep state, and therefore, electric power to be consumed by the head 3 for printing is not efficiently ensured. When the printing operation of the recording head 3 in step S212 is completed, the voltage level of the output terminal PO1 is brought into a low level in step S213 (refer to a timing 305 of FIG. 3C). By this, the FET 103 in FIG. 1 is turned off. Then, the head power source control sequencer 122 outputs a signal from the output terminal PO2 so as to select the charge current value Ikeep of the charge circuit 106 (S214). That is, current of the charge current value Ikeep is supplied to the head 3 again.

Then, it is determined whether the voltage of the electrolytic capacitor 105 detected by the voltage detection circuit 134 is equal to or smaller than the threshold value Vth_error (S215). When it is determined that the voltage of the electrolytic capacitor 105 is not equal to or smaller than the threshold value Vth_error (No in step S215), the process proceeds to step S216, and otherwise (Yes in step S215), it is determined that an error is detected and an error process is performed. As the error process, the FET 103 of FIG. 1 is turned off and the charge circuit 106 of FIG. 1 is turned off. Furthermore, the discharge circuit 107 may be turned on so that discharge is actively performed, for example.

In step S217, it is determined whether the printing has been terminated. When it is determined that the printing has been terminated (Yes in step S217), control for discharge of the head power supply capacitor is performed (S219 to S223). The electrolytic capacitor 105 performs discharge while restricting current using the discharge circuit 107. Here, as with the case of the charge of the electrolytic capacitor 105, when the electrolytic capacitor 105 performs discharge, a setting is performed such that a thermal restriction of the FET of the discharge circuit 107 is satisfied. Heat obtained by a product of a potential difference between a source and a drain of the FET of the discharge circuit 107 and an absolute value of a value of current supplied to the discharge circuit 107 is set to be equal to or lower than allowable power dissipation of the FET of the discharge circuit 107. In a case where the potential difference between the source and the drain corresponds to the threshold value Vth3 and the current value is denoted by Idis3, for example, an amount of heat generated in the discharge circuit 107 is represented by "Vth3×Idis3". Similarly, in a case where the potential difference between the source and the drain corresponds to the threshold value Vth2 and the current value is denoted by Idis2, for example, an amount of heat generated in the discharge circuit 107 is represented by "Vth2×Idis2". Furthermore, in a case where the potential difference between the source and the drain corresponds to the threshold old value Vth1 and the current value is denoted by Idis1, for example, an amount of heat generated in the discharge circuit 107 is represented by "Vth1×Idis1". All the amounts of heat Vth3×Idis3, Vth2×Idis2, and Vth1×Idis1 are set to be equal to or smaller than certain allowable power dissipation.

First, the head power source control sequencer 122 outputs a signal from the output terminal PO3 so as to select the discharge current value Idis3 of the discharge circuit 107 (S219). Here, the potential difference between the source and the drain of the FET of the discharge circuit 107 corresponds to a difference between GND and the head power source voltage, and therefore, the larger a head power source potential is, the larger the potential difference is. Accordingly, a small value is set to the charge current Idis3 in FIG. 3B from a timing 306 to a timing 307.

Then, it is determined whether the voltage of the electrolytic capacitor 105 detected by the voltage detection circuit 134 is smaller than the threshold value Vth2 (S220). When it is determined that the voltage of the electrolytic capacitor 105 detected by the voltage detection circuit 134 is smaller than the threshold value Vth2 (Yes in step S220), the head power source control sequencer 122 outputs a signal from the output terminal PO3 so as to select the discharge current value Idis2 of the discharge circuit 107 (S221). Specifically, the discharge current is switched from Idis3 to Idis2 at the timing 307. Here, a value slightly larger than the discharge current value Idis3 is set as the discharge current value Idis2. Then, it is determined whether the voltage of the electrolytic capacitor 105 detected by the voltage detection circuit 134 is smaller than the threshold value Vth1 (S222). When it is determined that the voltage of the electrolytic capacitor 105 detected by the voltage detection circuit 134 is smaller than the threshold value Vth1 (Yes in step S222), the head power source control sequencer 122 outputs a signal from the output terminal PO3 so as to select the discharge current value Idis1 of the discharge circuit 107 (S223). Specifically, the discharge current is switched from Idis2 to Idis1 at a timing 308. Then the discharge is completed at a timing 309 as illustrated in FIG. 3B.

The CPU 131 manages the entire print control and normal operation of a head power source as described below.

(1) A print instruction is received from an external apparatus connected to the printer or a print instruction, such as a copy operation instruction, is received through an operation unit of the printer. In response to the print instruction, the CPU 131 outputs an instruction for turning on the head power source to the head power source control block 102 in parallel to start of preparation of print data from print job data. The head power source control block 102 starts the flow illustrated in FIGS. 2A and 2B in response to the instruction for turning on the head power source (S201).

(2) The CPU 131 monitors a state of the head power source control sequencer 122 so as to determine whether a maintaining state is entered in parallel to the preparation of print data from print job data. Although the CPU 131 monitors the state of the head power source control sequencer 122 in this embodiment, the present invention is not limited to this. For example, the CPU 131 may determine whether the head power source voltage is equal to or larger than the threshold value Vth1 in accordance with an output value of the voltage detection circuit 134 and a value obtained by directly inputting the divided voltages of the resistances 111 and 112 and performing AD conversion on the divided voltages. When determining that the maintaining state is entered, the CPU 131 periodically monitors the output value of the voltage detection circuit 134 and the value obtained by directly inputting the divided voltages of the resistances 111 and 112 and performing the AD conversion on the divided voltages. When the values correspond to a "state in which the head power source voltage is equal to or smaller than the threshold value Vth_error", the CPU 131 determines that a failure state is detected and performs an error process.

(3) When the preparation of print data is completed in a state other than the error state, the CPU 131 determines that printing is available and outputs an instruction for starting a printing operation to the head power source control block 102. In response to the instruction for starting a printing operation, the head power source control block 102 performs the process in step S211. Thereafter, the CPU 131 transmits the print data to the head 3 and performs a printing operation.

(4) When the printing operation is completed, the CPU 131 outputs an instruction for terminating the printing operation to the head power source control block 102. In response to the instruction for terminating the printing operation, the head power source control block 102 performs the process in step S213.

(5) If next print job data exists, the process from (2) to (3) is performed again.

(6) If next print job data does not exist, the CPU 131 outputs an instruction for turning off the head power source to the head power source control block 102. In response to the instruction for turning off the head power source, the head power source control block 102 performs the process in step S219.

Here, in this embodiment, after the charge of the electrolytic capacitor 105 is completed, the voltage of the electrolytic capacitor 105 is monitored so that malfunction caused by drop of the power source voltage at a time of instantaneous interruption or the like which occurs before start of operation of the recording head 3 or which occurs while the recording head 3 is stopped is prevented.

Figure 4:
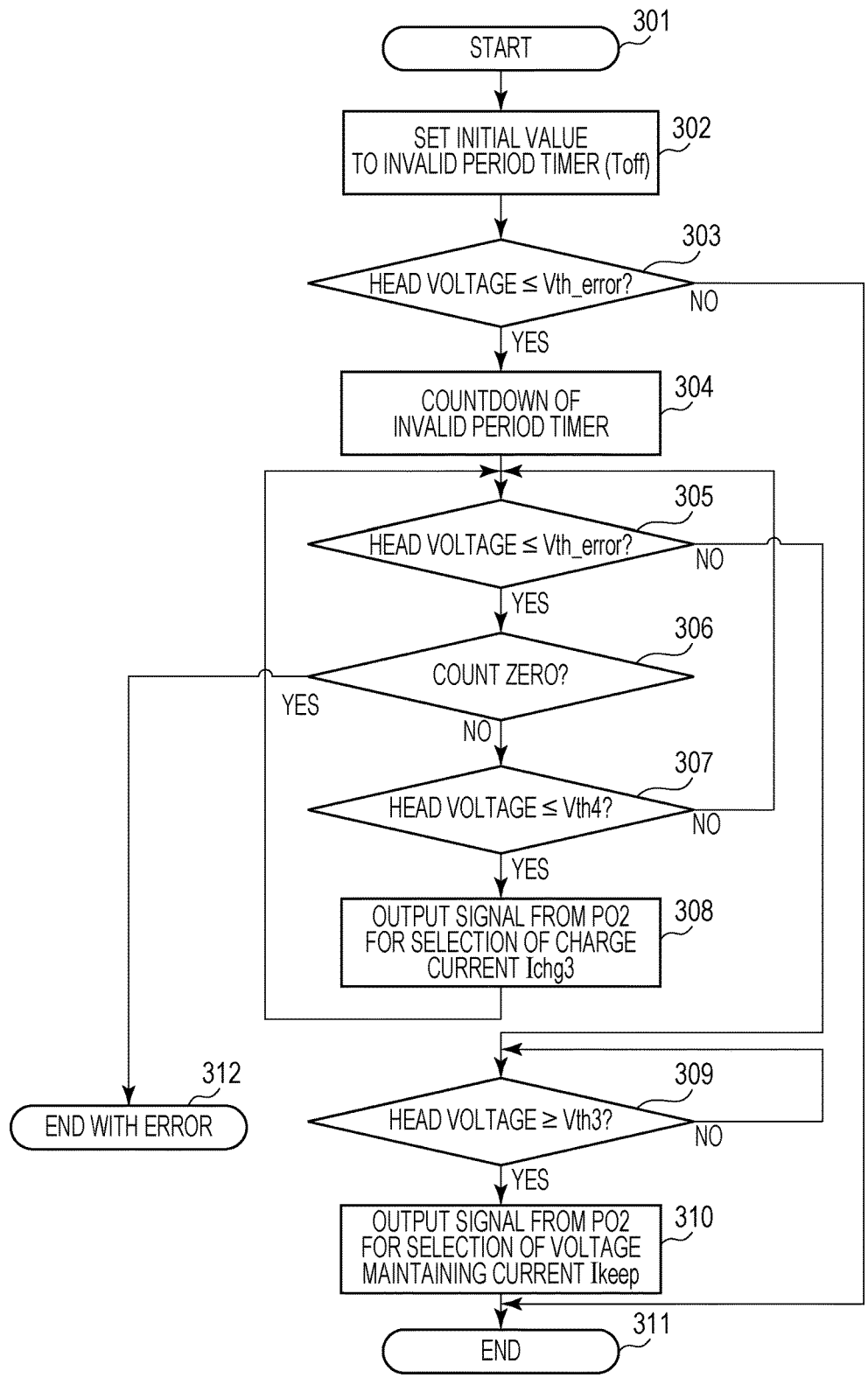
FIG. 4 is a flowchart illustrating switching of power supply to a printing heat in voltage monitoring.

Specifically, when the head power source voltage monitored by the voltage detection circuit 134 drops to be equal to or smaller than a predetermined value, the head power source control sequencer 122 performs control such that a current value is increased. A program for executing this process is periodically activated, for example, every 10 ms, using a timer incorporated in the CPU 131 in a period of time from when a certain waiting time is elapsed after the process in step S202 is started to when the discharge process in step S219 is started. A control flow performed when monitoring of a Vc voltage value is started will be described with reference to FIG. 4. The flowchart illustrated in FIG. 4 is realized when the CPU 131 reads a program stored in the ROM 132 into the RAM 133 and executes the program.

After the charge circuit 106 starts charge of the electrolytic capacitor 105 (S202) and a predetermined waiting time is elapsed, voltage monitoring is started (S301). Here, the waiting time corresponds to a period of time until the charge performed by the charge circuit 106 is completed, and is determined in advance in accordance with charge capability of the charge circuit 106 and capacity of the electrolytic capacitor 105. After the waiting time is elapsed, the CPU 131 sets an initial value (Toff) to an invalid period timer (S302). In this embodiment, 2 seconds is set as the initial value, for example.

The CPU 131 reads a voltage level (a voltage value) of the electrolytic capacitor 105 through the input terminal PI1 and compares the voltage level with the threshold value voltage Vth_error so as to determine whether the voltage level is equal to or smaller than the threshold value voltage Vth_error (S303). The threshold value voltage Vth_error is predetermined for a determination as to whether the head power source voltage is close to the VM voltage. If the voltage of the electrolytic capacitor 105 (the C1 voltage) is close to the VM voltage, the voltage is larger than the threshold value voltage Vth_error. Furthermore, the threshold value voltage Vth_error is a threshold value for specifying failure of the power supply circuit and the head 3. When the C1 voltage is equal to or smaller than the threshold value voltage Vth_error (equal to or smaller than the threshold value) and a predetermined period of time has elapsed, it is determined that failure occurs in at least one of the power supply circuit and the head 3. Note that monitoring of the C1 voltage is performed after the charge of the electrolytic capacitor 105 is completed and before discharge is performed as described above. Examples of a case where failure is detected in the power supply circuit or the head 3 include a case where insulation failure occurs in an electric contact of the recording head 3, a case where leakage current of the recording head 3 is increased, and a case where the power supply circuit is short-circuited. In this case, a potential becomes equal to or smaller than the certain voltage (Vth_error). In this case, when printing is executed, print failure or failure of the printer occurs.

When the head voltage is equal to or smaller than the threshold value voltage Vth_error, that is, the voltage of the electrolytic capacitor 105 is equal to or smaller than the threshold value voltage Vth_error (Yes in step S303), the CPU 131 starts countdown of the invalid period timer (S304) since it is possible that instantaneous interruption or the like has occurred. It is determined whether the head voltage is equal to or smaller than the threshold value voltage Vth_error (S305).

When it is determined that the head voltage is equal to or smaller than Vth_error (Yes in step S305), the CPU 131 determines whether a count value of the invalid period timer is zero (S306). When the count value of the invalid period timer is zero (Yes in step S306), an error process is performed. In the error process, the power supply to the head 3 through the power supply line is terminated. Specifically, the FET 103 of FIG. 1 is turned off and the charge circuit 106 of FIG. 1 is turned off. Furthermore, the power source circuit 101 is turned off. Moreover, the discharge circuit 107 may be turned on so that discharge is actively performed, for example.

When the count value of the invalid period timer is not zero (No in step S306), it is determined whether the head voltage is equal to or smaller than a threshold value Vth4 (S307). When the head voltage is not equal to or smaller than the threshold value Vth4 (No in step S307), the process returns to step S305. On the other hand, when it is determined that the head voltage is equal to or smaller than the threshold value Vth4 (Yes in step S307), the head power source control sequencer 122 outputs a signal from the output terminal PO2 so as to select the charge current value Ichg3 of the charge circuit 106 (S308). Specifically, the charge current value of the charge circuit 106 is switched from Ikeep to Ichg3. Thereafter the process returns to step S305. When the head voltage is not equal to or smaller than the threshold value Vth_error (No in step S305), it is determined whether the head voltage is equal to or larger than the threshold value Vth3 (S309). When it is determined that the head voltage is equal to or larger than the threshold value Vth3 (Yes in step S309), the head power source control sequencer 122 outputs a signal from the output terminal PO2 so as to select the charge current value Ikeep of the charge circuit 106 (S310) and the process is terminated (S311).

When the head voltage is not equal to or smaller than the threshold value Vth_error, that is, the voltage of the electrolytic capacitor 105 is larger than the threshold value Vth_error (No in step S303), the monitoring process is terminated.

Here, as described above, when the head voltage is equal to or smaller than the threshold value Vth_error and equal to or smaller than the threshold value Vth4, the charge current value Ichg3 is selected. Then, in the case where the count value is zero when it is determined that the head voltage is equal to or smaller than the threshold value Vth_error again, that is, the invalid period has elapsed, an error process is executed. In other words, in a case where the head voltage is equal to or smaller than the threshold value Vth_error even after the invalid period has elapsed (Yes in step S305 and step S306), an error process is executed.

The capacitor voltage is monitored by periodically performing the operation described above. In this embodiment, when the head power source voltage drops owing to instantaneous interruption or the like, an error is not detected in the predetermined period of time (2 seconds, for example) set as the initial value (Toff) of the invalid period timer.

In this way, the invalid period is set in accordance with a result of the determination as to whether the head voltage is equal to or smaller than the threshold value Vth_error, it is determined whether the head voltage is equal to or smaller than the threshold value Vth_error again after the set invalid period has elapsed, and it is determined whether an error process is to be performed in accordance with a result of the determination. The voltage of the electrolytic capacitor 105 and error detection at a time when instantaneous interruption occurs will be described with reference to FIGS. 5A and 5B and FIGS. 6A and 6B. FIGS. 5A and 5B are timing charts illustrating change of the voltage of the electrolytic capacitor 105 when voltage drop occurs owing to instantaneous interruption which occurs after the charge of the electrolytic capacitor 105 of the head 3 is completed and an error detection operation. In FIGS. 5A and 5B, the C1 voltage indicates the voltage of the electrolytic capacitor 105, and the VM voltage output from the power source circuit 101 is denoted by a dotted line.

Here, Ichg denotes a current value (a charge current value) of current to be supplied to the electrolytic capacitor 105, and Ikeep denotes a current value for detecting increase of leakage while the voltage of the electrolytic capacitor 105 is maintained. Accordingly, the current value Ikeep is smaller than the current value Ichg. When the electrolytic capacitor 105 is charged, a large current value is set so that a short charge time is attained. However, when the voltage is maintained, a small current value is set so that accuracy of detection of leakage is enhanced.

Here, in a case where instantaneous interruption occurs in the voltage maintaining state, the voltage (the C1 voltage) of the electrolytic capacitor 105 drops to the preset threshold value Vth_error owing to drop of the VM voltage output from the power source circuit 101. Here, the instantaneous interruption means a case where applying of a voltage from the power source circuit 101 is temporarily stopped for a short time owing to external factors.

An error detection invalid period (Toff) is set so that it is not determined that an error has occurred since failure occurs in the power supply circuit or a device at a time when the instantaneous interruption has occurred. If the voltage of the electrolytic capacitor 105 recovers within the set invalid period, inappropriate error detection is not performed. In a case where the C1 voltage is equal to or smaller than the threshold value Vth_error when the invalid period (Toff) has elapsed after the error operation is started, an error is detected and the electric power is blocked (current supply is stopped).

However, as illustrated in FIG. 5A, in a case where the current value Ikeep is small, a long period of time is required for recovery of the head capacitor voltage after the instantaneous interruption occurs. As the capacity of the electrolytic capacitor 105 is large, the recovery of the voltage within the set period delays. In this case, as illustrated in FIG. 5A, the capacitor voltage does not completely recover even when the set timer invalid period (Toff) has elapsed after voltage drop is detected, and accordingly, an error is detected. On the other hand, if a long error detection invalid period is set so that error detection of the instantaneous interruption is avoided, a long period of time is required for error detection. Furthermore, a voltage drop time of the C1 voltage is determined in accordance with a leakage current ILeak and current supplied from the charge circuit 106. In a case where large current (denoted by Ichg in FIGS. 5A and 5B, for example) is supplied from the charge circuit 106, the C1 voltage gradually drops when leakage occurs, and therefore, a long period of time is required until the C1 voltage drops to the threshold value voltage Vth_error for start of the error detection process. Accordingly, a long period of time is required before the error detection operation is started.

Figure 6A:
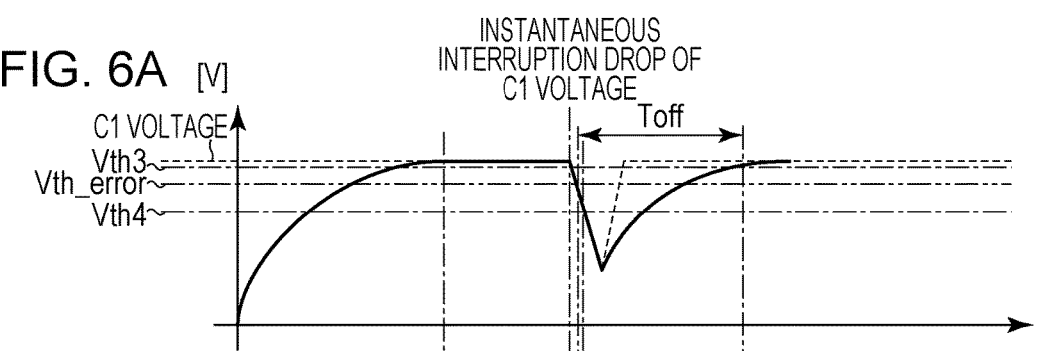
FIGS. 6A and 6B are timing charts illustrating a voltage of the electrolytic capacitor and a value of current supplied from a charge circuit according to the first embodiment.
Figure 6B:
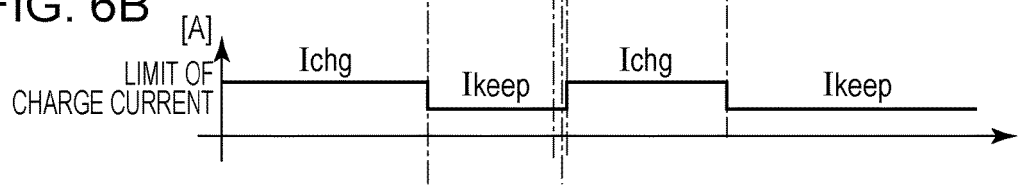
Figure 7A:
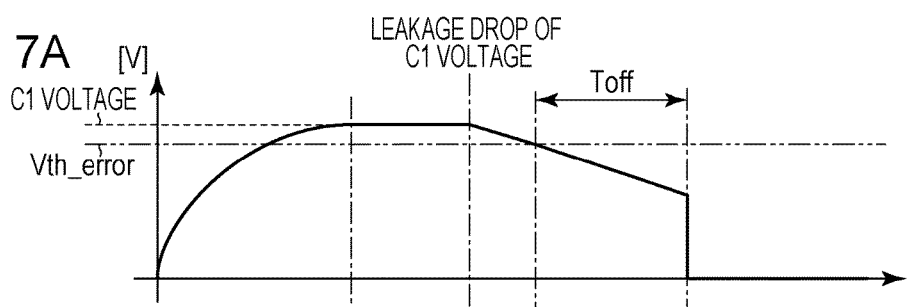
FIGS. 7A and 7B are timing charts illustrating charge and discharge according to the first embodiment.
Figure 7B:
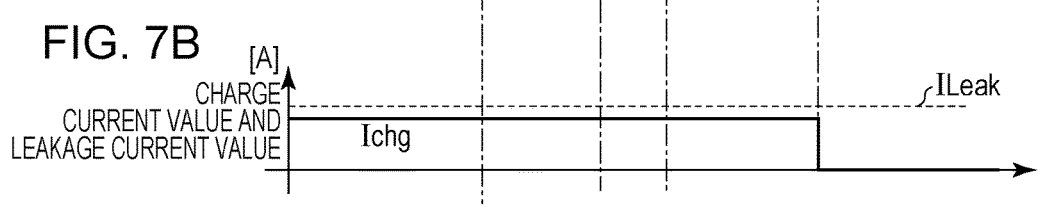
Figure 8A:
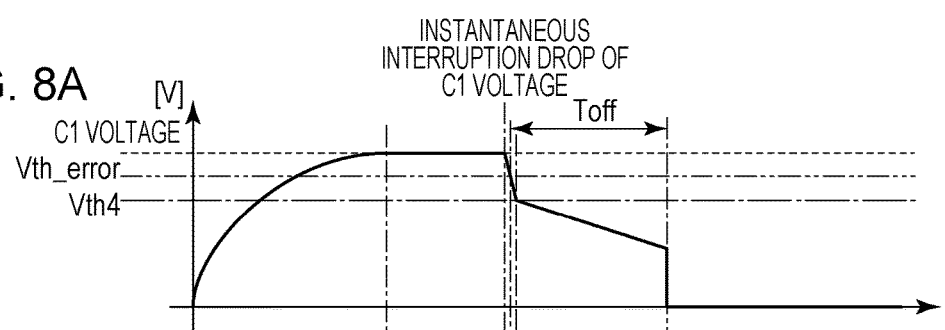
FIGS. 8A and 8B are timing charts illustrating charge and discharge according to the first embodiment.
Figure 8B:
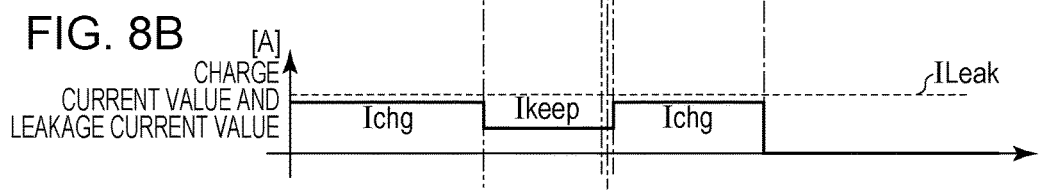

Accordingly, in this embodiment, in a case where the current value is reduced after the charge is completed and the voltage of the electrolytic capacitor 105 drops, the current supplied from the charge circuit 106 is increased as illustrated in FIGS. 6A and 6B. Specifically, in this embodiment, the CPU 131 sets the current value Ikeep which is sufficiently smaller than the current value Ichg after the charge is completed. Then, when the voltage of the electrolytic capacitor 105 becomes equal to or smaller than the threshold value Vth_error owing to the instantaneous interruption or the like and further equal to or smaller than the preset threshold value Vth4, the CPU 131 switches the maintaining current Ikeep to the charge current Ichg. By this, a period of time from when the voltage drops owing to the instantaneous interruption to when the voltage recovers to the voltage at a time of the completion of the charge may be reduced. Furthermore, if the voltage of the electrolytic capacitor 105 recovers to a voltage which is sufficiently close to the VM voltage (here, the threshold value Vth3) or more, the CPU 131 switches the current value output from the charge circuit 106 to the maintaining current Ikeep again. By this, high accuracy of detection of leakage is attained. Furthermore, if current leakage occurs in a state in which the maintaining current Ikeep which is sufficiently smaller than the charge current Ichg is supplied, the voltage of the electrolytic capacitor 105 quickly drops. Therefore, the error detection operation is started immediately after the occurrence of leakage. Accordingly, a period of time from the occurrence of leakage to completion of the error process is reduced.

Here, when the CPU 131 detects that the voltage (the C1 voltage) of the electrolytic capacitor 105 is equal to or smaller than the threshold value Vth4, the CPU 131 switches the maintaining current Ikeep to the charge current Ichg. However, the voltage does not rise while the leakage occurs. Therefore, an error is detected after the invalid period (Toff) has elapsed. After an error is detected, the electric power is blocked.

Figure 12A:
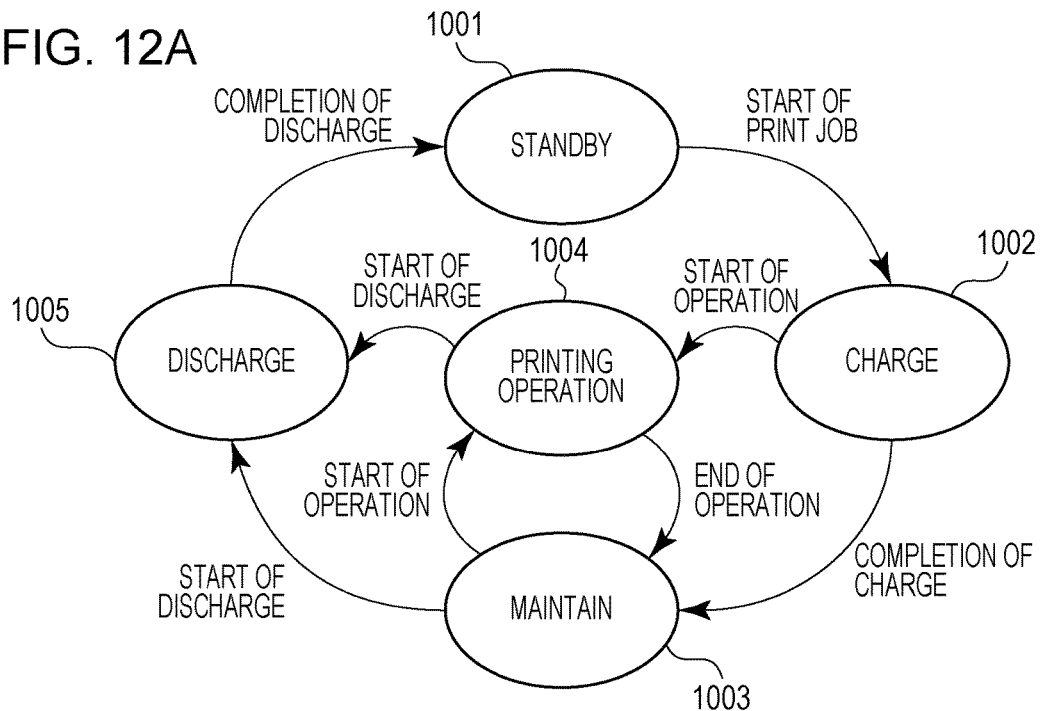
FIGS. 12A and 12B are diagrams illustrating state transition according to the first embodiment.
Figure 12B:
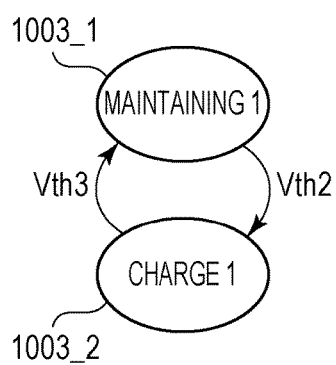

The head power source control block 102 will now be described with reference to FIGS. 12A and 12B. FIGS. 12A and 12B are diagrams illustrating management of states in the head power source control sequencer 122. In FIG. 12A, a state in which the head 3 is turned off is denoted by a "standby 1001". When a print job is input, a charge state 1002 is entered so that the head 3 is turned on. When the C1 voltage becomes equal to or larger than the threshold value Vth3 and the charge is completed, a maintaining state 1003 of FIG. 12A is entered. Here, the charge circuit 106 switches current to be supplied from Ichg to Ikeep.

FIG. 12B is a diagram illustrating state transition in a case where the maintaining state 1003 is described in detail. When the C1 voltage becomes equal to or smaller than the threshold value Vth4 in a first maintaining state 1003_1, a first charge state 1003_2 is entered as illustrated in FIG. 12B. Here, the charge circuit 106 switches current to be supplied from Ikeep to Ichg. When the C1 voltage exceeds the threshold value Vth3, the first charge state 1003_2 is switched to the first maintaining state 1003_1. Here, the charge circuit 106 switches current to be supplied from Ichg to Ikeep.

When the printing operation is started, a printing operation state 1004 is entered. The maintaining state 1003 and the printing operation state 1004 are alternately entered until the print job is completed.

When the printing operation is terminated, a discharge state 1005 is entered. Even in a case where failure is detected while the C1 voltage is monitored, the discharge state 1005 is entered. Although it is likely that failure is detected while the C1 voltage is monitored especially in the maintaining state 1003, if failure is detected in the printing operation state 1004, the discharge state 1005 may be immediately entered.

The current value Ikeep will now be described. After the head power source circuit completes the charge of the electrolytic capacitor 105 of the head 3, electric charge may be reduced owing to various reasons and discharge may be naturally performed even when failure does not occur in the device including the power supply circuit and the electric load. Examples of such natural discharge current include current supplied to the resistances 111 and 112 of FIG. 1 for detection and leakage current naturally generated since the head 3 is manufactured by a semiconductor process. By preventing drop of the head power source voltage owing to these phenomena, the printing operation may be immediately started even when a certain period of time has elapsed after the charge operation. Accordingly, a value larger than these natural discharge currents is set to the current value Ikeep. The natural discharge current may be estimated in advance from the configuration of the power supply circuit and the configuration of the device including the load. The current value Ikeep is larger than the estimated natural discharge current. Next, an upper limit of the current value Ikeep will be described with reference to FIGS. 7A and 7B and FIGS. 8A and 8B. In a case where leakage of the head 3 is increased for some reasons, which is a failure state in the recording apparatus, it is desirable that the increase of the leakage is appropriately detected and an error process is executed. A speed of drop of the voltage (the C1 voltage) of the electrolytic capacitor 105 at the time when the leakage other than the natural discharge occurs is determined by "ILeak−Ikeep". Accordingly, if the maintaining current Ikeep is a large current value (a current value substantially equal to the charge current Ichg, for example), a long period of time is required before the voltage (the C1 voltage) of the electrolytic capacitor 105 becomes smaller than the error detection voltage (Vth_error), and accordingly, a long period of time is required for detection of failure.

Therefore, in this embodiment, a value equal to or smaller than a specific value is set to the current value Ikeep so that failure may be detected at an appropriate timing in the leakage current ILeak in a failure state. For example, when the current value is equal to or smaller than the current value Ikeep, it is difficult to detect failure caused by the voltage drop, and therefore, the current value Ikeep may be set such that an amount of heat of VM×Ikeep is included in an allowable range.

As described above, according to this embodiment, a period of time from when the capacitor voltage drops to when the error detection is started may be reduced by reducing the current value after the charge is completed to be smaller than the current value at the time of charging, and accordingly, occurrence of failure in the head power source circuit may be appropriately specified. Specifically, when current is abnormally leaked from the recording head 3, the leakage current may be immediately detected and power supply to the recording head 3 may be stopped.

Then, if the voltage drops in a state in which current of a small value is supplied after the completion of the charge, a value of current supplied to the power supply line is increased. By this, even in a case where instantaneous interruption occurs, a period of time before it is determined that failure has occurred in the device having the power supply circuit and the electric load may be reduced.

As described above, according to this embodiment, leakage current of the head 3 may be appropriately detected without deteriorating performance of the printer.

Note that it is highly likely that cost is increased if a circuit for soft start is added to the AC/DC converter to suppress inrush current or a switch which has resistance to inrush current is provided. However, in this embodiment, inrush current to the FET 103 may be prevented since a value of current supplied to the power supply circuit is restricted by the charge circuit 106.

As described above, failure may be reliably specified while a charge time of the electrolytic capacitor 105 is reduced when the failure occurs in the power supply circuit or the load.

According to this embodiment, failure may be reliably specified while a charge time of the electrolytic capacitor 105 is reduced when the failure occurs in the power supply circuit or the load.

Second Embodiment

In the first embodiment, only the voltage (the C1 voltage) of the electrolytic capacitor 105 is monitored, the CPU 131 detects occurrence of rapid drop of a voltage even in the maintaining state after the charge of the electrolytic capacitor 105 is completed, and charge current is switched. On the other hand, in a second embodiment, charge current is switched in accordance with a voltage difference between a voltage (a VM voltage) of a power source circuit 101 and a voltage (a C1 voltage) of an electrolytic capacitor 105. Descriptions the same as those of the first embodiment are omitted. Reference numerals the same as those of the first embodiment are used for the same components.

This embodiment will be described with reference to FIGS. 9A to 9C and FIGS. 10A to 10C.

Figure 9A:
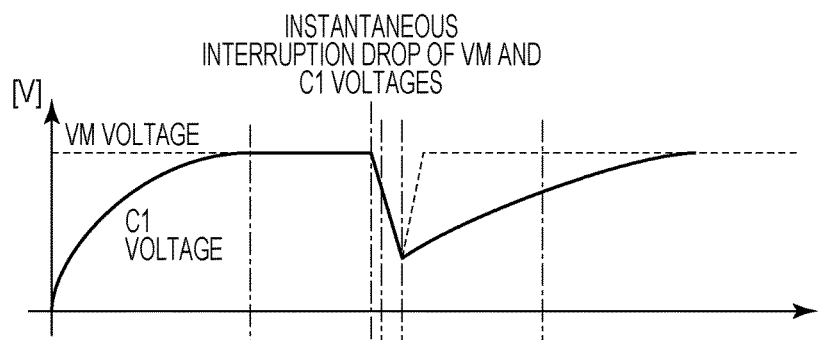
FIGS. 9A to 9C are timing charts illustrating a potential difference at a time when the instantaneous interruption occurs.
Figure 9B:
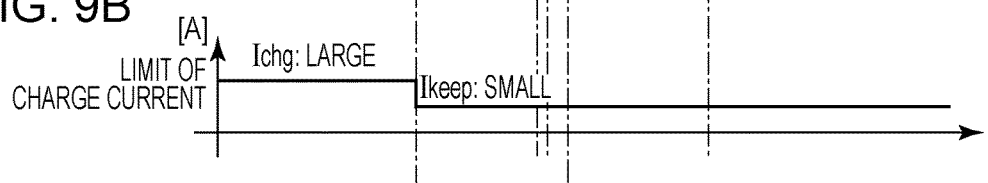
Figure 9C:
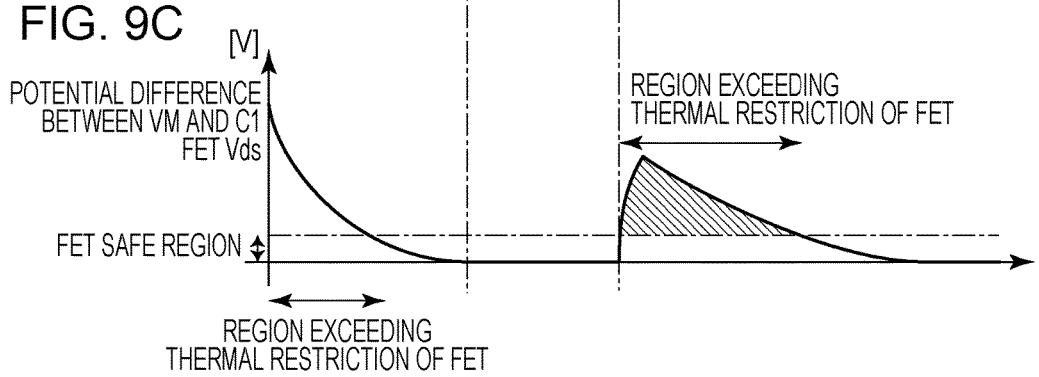

As illustrated in FIGS. 9A to 9C, when determining that the C1 voltage is equal to or larger than a threshold value Vth3 and charge of the electrolytic capacitor 105 has been completed, a CPU 131 sets a current value Ikeep as current supplied from a charge circuit 106. Thereafter, when instantaneous interruption occurs, although a voltage (a VM voltage) output from the power source circuit 101 immediately recovers, a long period of time is required for recovering the voltage (the C1 voltage) of the electrolytic capacitor 105 since charge current is restricted by the current value Ikeep. Here, a FET 103 serving as a charge switch has thermal restriction and a setting is performed such that heat calculated by a product of a potential difference between a source and a drain and supplied current satisfies allowable power dissipation of the FET 103 of the charge circuit 106. For example, in a case where the potential difference is VM−C1 and the current is Ion, an amount of generated heat is represented by "(VM−C1)×Ion". In a case where a print start instruction is issued to the CPU 131 immediately after instantaneous interruption, although the VM voltage recovers, the voltage of the electrolytic capacitor 105 is still small, that is, a potential difference between the VM voltage and the voltage of the electrolytic capacitor 105 is still large. In this state, the large current Ion is supplied at a time of printing. Here, the heat exceeds the allowable power dissipation of the FET, and therefore, it is possible that the FET is destroyed. Accordingly, a period of time in which the apparatus is used over the thermal restriction in a case where large current is supplied while the potential difference between the voltage of the electrolytic capacitor 105 and the VM voltage is large, for example, is preferably shorter.

Therefore, in this embodiment, when the CPU 131 determines that the difference between the two voltages, that is, the VM voltage and the C1 voltage, is large, the charge current is switched to a current value Ichg which is larger than the current value Ikeep. In this embodiment, the voltage detection circuit 134 illustrated in FIG. 1 reads voltages divided by the resistances 113 and 114 as the VM voltage using an input terminal PI2 of the voltage detection circuit 134. Furthermore, the voltage detection circuit 134 reads voltages divided by the resistances 111 and 112 as the C1 voltage using an input terminal PI1 of the voltage detection circuit 134. When a difference between the read VM voltage and the read C1 voltage is equal to or larger than a predetermined threshold value for current switching, the charge current value is switched from Ikeep to Ichg.

The threshold value for current switching is defined in accordance with a calculation formula obtained by the allowable power dissipation of the FET, and is smaller than a voltage of a Vds monitor, for example.

Figure 10A:
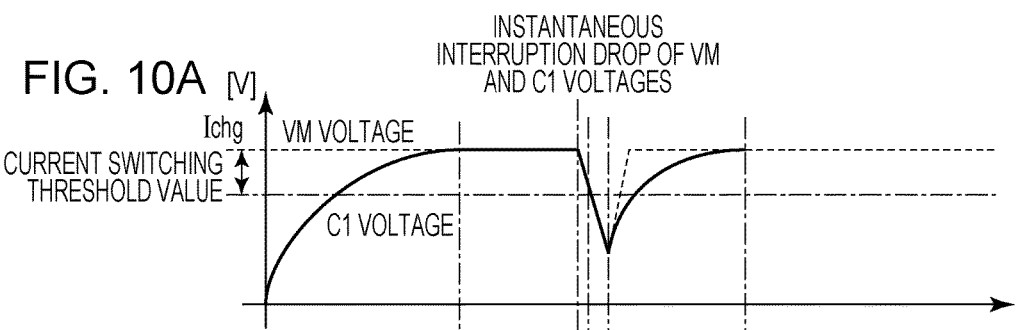
FIGS. 10A to 10C are timing charts illustrating charge and discharge according to a second embodiment.
Figure 10B:
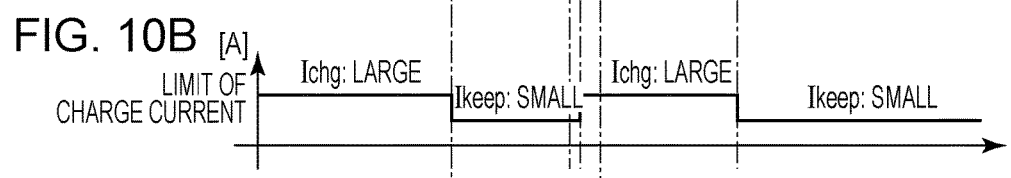
Figure 10C:
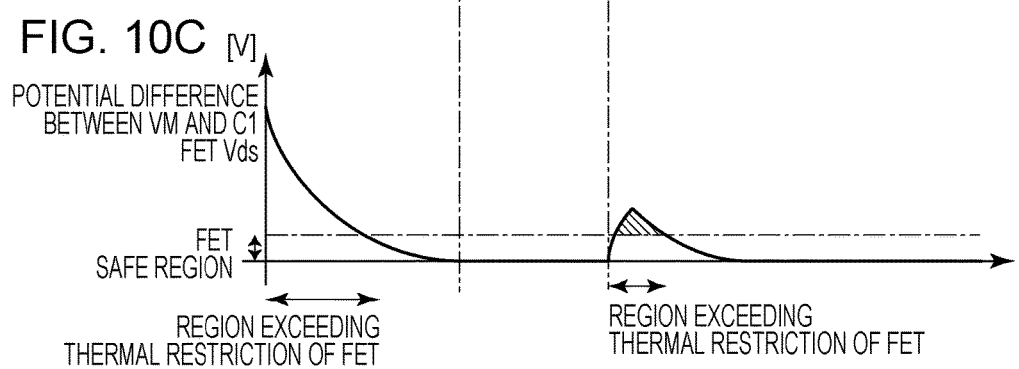

By this, since the voltage (the C1 voltage) of the electrolytic capacitor 105 quickly recovers as illustrated in FIGS. 10A to 10C, a period of time in which the FET is used over the thermal restriction is reduced.

Note that, as with the first embodiment, the voltage monitoring is performed after the charge is completed and before the discharge is started, or in the first charge state and the first maintaining state in FIG. 12B.

Here, in this embodiment, after the charge of the electrolytic capacitor 105 is completed, the voltage of the electrolytic capacitor 105 is monitored so that malfunction caused by drop of power source voltage owing to instantaneous interruption which occurs before start of operation of the recording head 3 or which occurs while the recording head 3 is stopped is prevented. Specifically, when the head power source voltage monitored by the voltage detection circuit 134 drops to be equal to or smaller than the predetermined value, a head power source control sequencer 122 performs control such that a current value is increased. A program for executing this process is periodically activated, for example, every 10 ms, using a timer incorporated in the CPU 131 in a period of time from when a predetermined period of time is elapsed after the process in step S202 is started to when discharge process of step S219 is started. A control flow performed when monitoring of the C1 voltage is started will be described with reference to FIG. 11. The flowchart illustrated in FIG. 11 is realized when the CPU 131 reads a program stored in a ROM 132 into a RAM 133 and executes the program.

After the charge circuit 106 starts charge of the electrolytic capacitor 105 (S202) and a predetermined waiting time is elapsed, voltage monitoring is started (S1001). Here, the waiting time corresponds to a period of time before the charge performed by the charge circuit 106 is completed, and is determined in advance in accordance with charge capability of the charge circuit 106 and capacity of the electrolytic capacitor 105. After the waiting time is elapsed, the CPU 131 sets an initial value (Toff) to an invalid period timer (S1002). In this embodiment, 2 seconds is set as the initial value, for example.

Furthermore, the voltage detection circuit 134 illustrated in FIG. 1 reads voltages divided by the resistances 113 and 114 as the VM voltage using the input terminal PI2 of the voltage detection circuit 134. Furthermore, the voltage detection circuit 134 reads voltages divided by the resistances 111 and 112 as the C1 voltage using the input terminal PI1 of the voltage detection circuit 134. Then the CPU 131 determines whether a difference between the VM voltage and the read C1 voltage is equal to or larger than a predetermined threshold value (S1003). The predetermined threshold value is used to specify failure of the power supply circuit or the head 3. When the difference between the VM voltage and the C1 voltage is equal to or larger than the predetermined threshold value and a predetermined period of time has elapsed, it is determined that failure occurs in at least one of the power supply circuit and the head 3.

When the difference between the VM voltage and the C1 voltage is equal to or larger than the predetermined threshold value (Yes in step S1003), the CPU 131 starts countdown using the invalid period timer since it is possible that instantaneous interruption has occurred (S1004). Then the CPU 131 determines whether a difference between the VM voltage and the C1 voltage is equal to or larger than the predetermined threshold value (S1005).

When it is determined that the difference between the VM voltage and the C1 voltage is equal or larger than the predetermined threshold value (Yes in step S1005), the CPU 131 determines whether a count value of the invalid period timer is zero (S1006). When the count value of the invalid period timer is zero (Yes in step S1006), an error process is performed.

On the other hand, when it is determined that the count value of the invalid period timer is not zero (No in step S1006), the head power source control sequencer 122 outputs a signal from an output terminal PO2 so as to select a charge current value Ichg3 of the charge circuit 106 (S1007). Specifically, the charge current value of the charge circuit 106 is switched from Ikeep to Ichg3. Thereafter the process returns to step S1005.

When the difference between the VM voltage and the C1 voltage is not equal to or larger than the predetermined threshold value (No in step S1005), it is determined whether the head voltage is equal to or larger than a threshold value Vth3 (S1008). When it is determined that the head voltage is equal to or larger than the threshold value Vth3 (Yes in step S1008), the head power source control sequencer 122 outputs a signal from the output terminal PO2 so as to select a charge current value Ikeep of the charge circuit 106 (S1009) and the process is terminated (S1010).

Note that when the difference between the VM voltage and the C1 voltage is not equal to or larger than the predetermined threshold value (No in step S1003), the monitoring process is terminated.

The capacitor voltage is monitored by periodically performing the operation described above. In this embodiment, when the head power source voltage drops owing to instantaneous interruption or the like, an error is not detected in a predetermined period of time (2 seconds, for example) set as the initial value (Toff) of the invalid period timer.

This embodiment may obtain the effects of the first embodiment.

Other Embodiments

The present invention is not limited to the foregoing embodiments. Although the power supply apparatus includes the head as the electric load in the foregoing embodiments, the present invention is not limited to this, and the power supply apparatus may not include the electric load. Specifically, the power supply apparatus may be connectable to the electric load and may supply electric power to the electric load.

Furthermore, although a current value supplied from the charge circuit 106 is switched when the electrolytic capacitor 105 is charged in the foregoing embodiments, the present invention is not limited to this, and a current value supplied from the charge circuit 106 may be constant.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-107869, filed May 27, 2015, which is hereby incorporated by reference herein in its entirety.

What is claimed is:

1. A power supply apparatus comprising:
   a power source configured to supply electric power to an electric load through a power supply line;
   a capacitor arranged to be connected to the power supply line which connects the power source and the electric load to each other;
   a charge circuit configured to charge the capacitor by the electric power supplied from the power source;
   a detector configured to detect a voltage value of the capacitor;
   a controller configured to change, after the charge of the capacitor is completed, a current value of the charge circuit to a first current value which is smaller than a current value supplied before the charge of the capacitor is completed; and
   a processor that operates to:
   determine whether a first condition is satisfied in accordance with the voltage value detected by the detector after the charge of the capacitor is completed, the first condition being determined to be satisfied if the voltage value detected by the detector is equal to or smaller than a predetermined threshold value; and
   determine whether an error process is to be performed in accordance with a result of the first condition determination,
   wherein, when the voltage value of the capacitor is equal to or smaller than the predetermined threshold value at a time when a predetermined period of time has elapsed from a time when the processor determines that the first condition is satisfied, the processor determines that the error process is to be performed,
   wherein, when the voltage value of the capacitor is larger than the predetermined threshold value at the time when the predetermined period of time has elapsed from the time when the processor determines that the first condition is satisfied, the processor determines that the error process is not to be performed, and
   wherein, if the processor determines that the first condition is satisfied after the charge of the capacitor is completed, the controller changes the current value supplied from the charge circuit to a current value which is larger than the first current value.

2. The power supply apparatus according to claim 1,
   wherein the processor determines that the first condition is satisfied if the voltage value detected by the detector is equal to or smaller than the predetermined threshold value,
   the processor determines, if determining that the first condition is satisfied after the charge of the capacitor is completed, whether the voltage value detected by the detector is equal to or smaller than a second threshold value which is smaller than the predetermined threshold value, and
   the controller changes the current value supplied from the charge circuit to a current value which is higher than the first current value if the processor determines that the voltage value detected by the detector is equal to or smaller than the second threshold value after the charge of the capacitor is completed.

3. The power supply apparatus according to claim 1, further comprising:
   a second detector configured to detect a voltage value of the power source,
   wherein the processor determines that the first condition is satisfied if a difference between the voltage value detected by the detector after the charge of the capacitor is completed and the voltage value detected by the second detector is equal to or larger than the predetermined threshold value.

4. The power supply apparatus according to claim 1, wherein power supply to the electric load through the power supply line is terminated in the error process.

5. The power supply apparatus according to claim 4, wherein the power source is turned off if the processor determines that the error process is to be executed.

6. The power supply apparatus according to claim 1, wherein the electric load is a print head.

7. The power supply apparatus according to claim 1, further comprising the electric load.

8. A printer comprising:
   a power source configured to supply electric power to a print head through a power supply line;
   a capacitor arranged to be connected to the power supply line which connects the power source and the print head to each other;
   a charge circuit configured to charge the capacitor by the electric power supplied from the power source;
   a detector configured to detect a voltage value of the capacitor;
   a controller configured to change, after the charge of the capacitor is completed, a current value of the charge circuit to a first current value which is smaller than a current value supplied before the charge of the capacitor is completed; and
   a processor that operates to:
   determine whether a first condition is satisfied in accordance with the voltage value detected by the detector after the charge of the capacitor is completed, the first condition being determined to be satisfied if the voltage value detected by the detector is equal to or smaller than a predetermined threshold value; and determine whether an error process is to be performed in accordance with a result of the first condition determination, wherein, when the voltage value of the capacitor is equal to or smaller than the predetermined threshold value at a time when a predetermined period of time has elapsed from a time when the processor determines that the first condition is satisfied, the processor determines that the error process is to be performed, wherein, when the voltage value of the capacitor is larger than the predetermined threshold value at the time when the predetermined period of time has elapsed from the time when the processor determines that the first condition is satisfied, the processor determines that the error process is not to be performed, and wherein, if the processor determines that the first condition is satisfied after the charge of the capacitor is completed, the controller changes the current value supplied from the charge circuit to a current value which is larger than the first current value.

9. The printer according to claim 8,
wherein the processor determines that the first condition is satisfied if the voltage value detected by the detector is equal to or smaller than the predetermined threshold value, the processor determines, if determining that the first condition is satisfied after the charge of the capacitor is completed, whether the voltage value detected by the detector is equal to or smaller than a second threshold value which is smaller than the predetermined threshold value, and the controller changes the current value supplied from the charge circuit to a current value which is higher than the first current value if the processor determines that the voltage value detected by the detector is equal to or smaller than the second threshold value after the charge of the capacitor is completed.

10. The printer according to claim 8, further comprising:
a second detector configured to detect a voltage value of the power source,
wherein the processor determines that the first condition is satisfied if a difference between the voltage value detected by the detector after the charge of the capacitor is completed and the voltage value detected by the second detector is equal to or larger than the predetermined threshold value.

11. A control method for controlling a power supply apparatus including:
a power source configured to supply electric power to an electric load through a power supply line,
a capacitor arranged to be connected to the power supply line which connects the power source and the electric load to each other, and
a charge circuit configured to charge the capacitor by the electric power supplied from the power source,
the control method comprising:
changing, after the charge of the capacitor is completed, a current value of the charge circuit to a first current value which is smaller than a current value supplied before the charge of the capacitor is completed;
detecting a voltage value of the capacitor;
determining whether a first condition is satisfied in accordance with the voltage value of the capacitor after the charge of the capacitor is completed, the first condition being determined to be satisfied if the voltage value detected by the detector is equal to or smaller than a predetermined threshold value; and determining whether an error process is to be performed in accordance with a result of the first condition determination, wherein, when the voltage value of the capacitor is equal to or smaller than the predetermined threshold value at a time when a predetermined period of time has elapsed from a time when the processor determines that the first condition is satisfied, the processor determines that the error process is to be performed, wherein, when the voltage value of the capacitor is larger than the predetermined threshold value at the time when the predetermined period of time has elapsed from the time when the processor determines that the first condition is satisfied, the processor determines that the error process is not to be performed, and wherein, if it is determined that the first condition is satisfied after the charge of the capacitor is completed, the current value supplied from the charge circuit is changed to a current value which is larger than the first current value.

12. The control method according to claim 11, wherein the changing to the current value which is larger than the first current value is performed if it is determined that the voltage value of the capacitor is equal to or smaller than the predetermined threshold value and further determined that the voltage value of the capacitor is equal to or smaller than a second threshold value which is smaller than the predetermined threshold value after the charge of the capacitor is completed.

13. The control method according to claim 11, further comprising:
detecting a voltage value of the power source,
wherein it is determined that the first condition is satisfied if a difference between the detected voltage value of the capacitor and the detected voltage value of the power source is equal to or larger than the predetermined threshold value after the charge of the capacitor is completed.

14. The power supply apparatus according to claim 1, wherein the detector further operates to detect a voltage of the electric load, and, when the voltage of the electric load is equal to or smaller than a predetermined voltage threshold for the electric load, the processor further operates to start a countdown of the predetermined period of time.

15. The power supply apparatus according to claim 14, wherein at least one of:
(i) the processor further operates to determine that the voltage of the electric load is equal to or smaller than the predetermined voltage threshold for the electric load, and when the processor determines that the voltage of the electric load is equal to or smaller than the predetermined voltage threshold for the electric load, the processor determines whether a count value for the countdown of the predetermined period of time is zero; and
(ii) when the count value for the countdown of the predetermined period of time is zero, an error process for the electric load is performed.

16. The power supply apparatus according to claim 15, when the count value for the predetermined period of time is not zero, the processor further operates to determine whether the voltage of the electric load is equal to or smaller than another threshold value.

17. The power supply apparatus according to claim 1, wherein:
(i) inappropriate error detection is not performed when the detector detects that the voltage value of the capacitor recovers and is larger than the predetermined threshold value within the predetermined period of time; and
(ii) when the voltage value of the capacitor is equal to or smaller than the predetermined threshold value when the predetermined period of time has elapsed, then an error is detected and the error process is performed.

18. The power supply apparatus according to claim 1, wherein:
(i) the processor further operates to determine whether a difference between a voltage value of the power source and the voltage value of the capacitor is equal or larger than the predetermined threshold value and, when the difference is equal to or larger than the predetermined threshold value, to determine whether a count value of the predetermined period of time is zero; and
(ii) the error process is performed when the count value of the predetermined period of time is zero.

19. The power supply apparatus according to claim 1, wherein the first current value is set so as to be larger than a natural discharge current value.

20. The power supply apparatus according to claim 1, wherein the charge circuit charges the capacitor while restricting the current value of the electric power supplied from the power source.

21. The power supply apparatus according to claim 1, wherein, if the processor determines that the first condition is not satisfied after the charge of the capacitor is completed, the controller does not change the current value supplied from the charge circuit to a current value which is larger than the first current value.

22. The power supply apparatus according to claim 1, wherein the predetermined threshold value is set for detecting failure in at least one of the power supply apparatus and the electric load.

23. The power supply apparatus according to claim 1, wherein the detector detects the voltage value of the capacitor after the charge of the capacitor is completed and before the capacitor performs discharge.

* * * * *